（12) United States Patent
Yin

(10) Patent No.: US 9,230,570 B1
(45) Date of Patent: Jan. 5, 2016

(54) WRITE HEAD HAVING TWO YOKES

(71) Applicant: Seagate Technology LLC, Cupertino, CA (US)

(72) Inventor: Huaqing Yin, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/471,892

(22) Filed: Aug. 28, 2014

(51) Int. Cl.
*G11B 5/17* (2006.01)
*G11B 5/31* (2006.01)

(52) U.S. Cl.
CPC .............. *G11B 5/17* (2013.01); *G11B 5/3133* (2013.01)

(58) Field of Classification Search
CPC ................................ G11B 5/3133; G11B 5/17
USPC ............. 360/125.03, 125.06, 125.11, 125.12, 360/125.15, 123.06
See application file for complete search history.

(56) References Cited

U.S. PATENT DOCUMENTS

| 3,891,995 | A | | 6/1975 | Hanazono et al. | |
|---|---|---|---|---|---|
| 4,631,612 | A | * | 12/1986 | Shiiki et al. | 360/125.15 |
| 4,652,957 | A | | 3/1987 | Schewe et al. | |
| 4,675,766 | A | | 6/1987 | Schewe | |
| 4,703,382 | A | | 10/1987 | Schewe et al. | |
| 4,713,711 | A | * | 12/1987 | Jones, Jr. | G11B 5/313 360/123.39 |
| 6,038,106 | A | * | 3/2000 | Aboaf et al. | 360/317 |
| 6,195,233 | B1 | * | 2/2001 | Akiyama et al. | 360/125.27 |
| 6,798,615 | B1 | | 9/2004 | Litinov et al. | |
| 6,954,331 | B2 | | 10/2005 | Crawford et al. | |
| 6,984,333 | B2 | | 1/2006 | Matono et al. | |
| 7,394,621 | B2 | * | 7/2008 | Li et al. | 360/125.15 |
| 7,515,381 | B2 | | 4/2009 | Baer et al. | |
| 7,656,612 | B2 | | 2/2010 | Sasaki et al. | |
| 7,672,079 | B2 | | 3/2010 | Li et al. | |
| 7,679,862 | B2 | | 3/2010 | Nakamoto et al. | |
| 8,004,792 | B2 | | 8/2011 | Biskeborn et al. | |
| 8,035,922 | B2 | | 10/2011 | Lille et al. | |
| 8,054,580 | B2 | * | 11/2011 | Kimura et al. | 360/125.1 |
| 8,107,191 | B2 | | 1/2012 | Im et al. | |
| 8,125,732 | B2 | * | 2/2012 | Bai et al. | 360/125.09 |
| 8,179,636 | B1 | * | 5/2012 | Bai et al. | 360/125.17 |
| 8,218,263 | B2 | * | 7/2012 | Allen et al. | 360/123.01 |
| 8,264,792 | B2 | | 9/2012 | Bai et al. | |
| 8,339,736 | B2 | | 12/2012 | Gao et al. | |
| 8,345,384 | B1 | * | 1/2013 | Sasaki et al. | 360/125.15 |
| 8,405,930 | B1 | * | 3/2013 | Li et al. | 360/125.08 |
| 8,416,528 | B1 | | 4/2013 | Sasaki et al. | |
| 8,472,135 | B1 | | 6/2013 | Kusukawa et al. | |
| 8,537,494 | B1 | | 9/2013 | Pan et al. | |
| 8,547,659 | B1 | | 10/2013 | Bai et al. | |
| 8,582,236 | B2 | | 11/2013 | Linville et al. | |
| 8,605,386 | B1 | | 12/2013 | Ohtake et al. | |
| 8,619,390 | B2 | | 12/2013 | Cazacu et al. | |
| 8,649,125 | B1 | | 2/2014 | Basu et al. | |

(Continued)

FOREIGN PATENT DOCUMENTS

| JP | 62165718 A | * | 7/1987 |
|---|---|---|---|
| JP | 02130710 A | | 5/1990 |
| JP | 2628854 B2 | * | 7/1997 |

*Primary Examiner* — Will J Klimowicz
(74) *Attorney, Agent, or Firm* — HolzerIPLaw, PC

(57) ABSTRACT

A write head comprising a main pole having a pole tip proximate an air bearing surface (ABS), a leading side and a trailing side, with a leading yoke on the leading side of the main pole and a trailing yoke on the leading side of the main pole. The leading yoke has a greater thickness than the trailing yoke, with a ratio of the thickness of the leading yoke to the trailing yoke of at least 1.5:1.

17 Claims, 4 Drawing Sheets

(56) References Cited

U.S. PATENT DOCUMENTS

| | | | |
|---|---|---|---|
| 8,665,561 B1 | 3/2014 | Knutson et al. | |
| 8,670,212 B2 | 3/2014 | Bai et al. | |
| 8,749,919 B2 | 6/2014 | Sasaki et al. | |
| 8,786,983 B1 | 7/2014 | Liu et al. | |
| 8,804,280 B2 | 8/2014 | Lopusnik et al. | |
| 8,817,418 B1 | 8/2014 | Matsuo et al. | |
| 8,842,387 B1 | 9/2014 | Horide et al. | |
| 8,879,208 B1 | 11/2014 | Liu et al. | |
| 8,917,480 B2 | 12/2014 | Liu et al. | |
| 9,082,428 B1 | 7/2015 | Xue et al. | |
| 2002/0071208 A1* | 6/2002 | Batra et al. | 360/125 |
| 2002/0135943 A1* | 9/2002 | Nishizawa et al. | 360/246.1 |
| 2004/0047079 A1* | 3/2004 | Ito et al. | 360/317 |
| 2004/0169958 A1 | 9/2004 | Krounbi et al. | |
| 2006/0002021 A1* | 1/2006 | Li et al. | 360/126 |
| 2007/0159719 A1 | 7/2007 | Yamakawa et al. | |
| 2008/0231994 A1* | 9/2008 | Kimura et al. | 360/235.4 |
| 2008/0316631 A1 | 12/2008 | Gao et al. | |
| 2008/0316643 A1 | 12/2008 | Linville et al. | |
| 2009/0116144 A1 | 5/2009 | Lee et al. | |
| 2010/0187120 A1 | 7/2010 | Seets et al. | |
| 2010/0277832 A1 | 11/2010 | Bai et al. | |
| 2012/0050915 A1 | 3/2012 | Hong et al. | |
| 2012/0147503 A1 | 6/2012 | Zou et al. | |
| 2012/0170154 A1 | 7/2012 | Sasaki et al. | |
| 2013/0003226 A1* | 1/2013 | Bai et al. | 360/125.12 |
| 2013/0242432 A1 | 9/2013 | Meloche et al. | |
| 2014/0307348 A1* | 10/2014 | Min et al. | 360/122 |
| 2014/0313614 A1* | 10/2014 | Hsiao et al. | 360/99.08 |

* cited by examiner

WRITE HEAD HAVING TWO YOKES

BACKGROUND

A disc drive is an example of a data storage system that uses magnetic fields for writing and reading data. Transducers write information to and read information from data surfaces of the discs. In one example, transducers include a recording or write head for generating a magnetic field that aligns the magnetic moments of a magnetic medium to represent desired bits of data. Magnetic recording heads include both longitudinal and perpendicular recording techniques. Perpendicular recording is a form of magnetic recording in which magnetic moments representing bits of data are oriented perpendicularly to the surface of the recording layer. Perpendicular magnetic write heads typically include main and return poles that are separated to form a write gap and extend from pole tips located at an air-bearing surface (ABS) to a back gap region. A coil is included to generate magnetic flux through the main and return poles in response to a current conducted through the coil. The main pole tip focuses the magnetic flux density such that the magnetic fields interact with the magnetic medium to orient its magnetic moments in an up or down direction.

As the desire for higher data rate and higher data density increases in magnetic memory storage, great challenges are placed on magnetic write head design.

SUMMARY

Implementations described and claimed herein include a write head having two yokes, with the trailing or top yoke being less than the leading or bottom yoke.

One particular implementation is a write head comprising a main pole having a leading side and a trailing side, a leading yoke on the leading side of the main pole, and a trailing yoke on the leading side of the main pole, wherein a ratio of the thickness of the leading yoke to the thickness of the trailing yoke is at least 1.5:1.

Another particular implementation is write head comprising a main pole having a pole tip proximate an air bearing surface (ABS), the main pole having a leading side and a trailing side, with a leading yoke on the leading side of the main pole and a trailing yoke on the trailing side of the main pole. The leading yoke has a thickness that is at least 1.5× of the trailing yoke thickness.

Yet another particular implementation is a disc drive having at least one magnetic storage disc and a transducer head comprising a read head and a write head, operably positioned to read and write data to the disc, the write head comprising a leading yoke and a trailing yoke having a thickness ratio of at least 1.5:1.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

DETAILED DESCRIPTION

Figure 1:
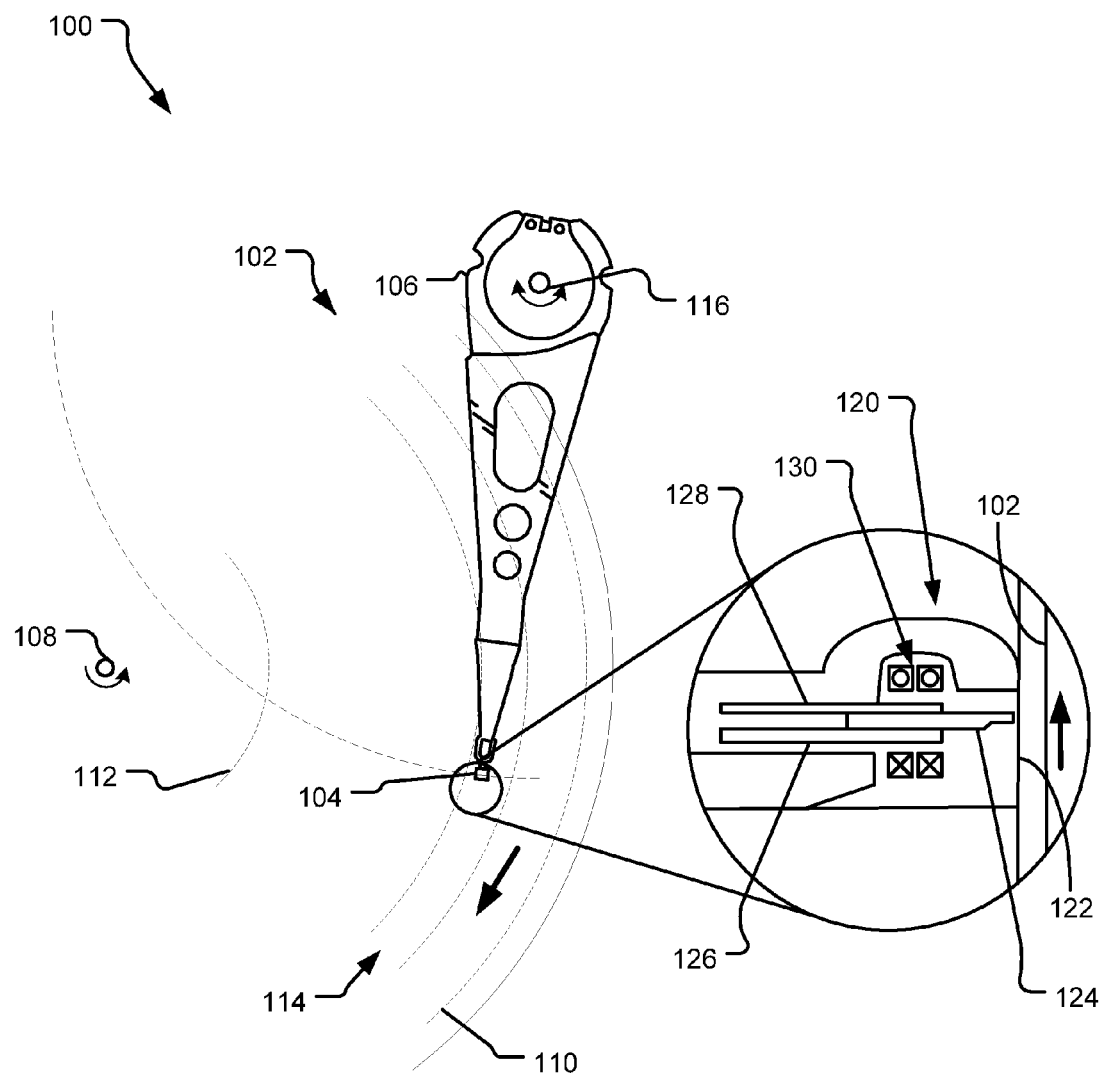
FIG. 1 is a schematic top view of storage device having an example write head implemented on an end of an actuator assembly.

As indicated above, the desire for higher data rate and higher areal density results in great challenges in designing the magnetic write head. In perpendicular recording, the write head 'writes' information into the recording media by switching writer's magnetic field from one polarity to the other through driving current waveform change. When recording at high data rate (HDR), the switching speed increases. Normally the write field magnitude will be degraded and magnitude variation will be enlarged with data rate increase. These not only cause poorer media saturation, but also cause worse transition sharpness between bits. In addition, since write field bubble expansion is slower at track edge than in track center, transition curvature along cross track will become larger with data rate increase. All these HDR effects will cause a poorer signal-to-noise ratio (SNR) to the recording information. The basic requirements to writer design for high areal density recording (high linear density and high track density) include strong writeability, confining field in down-track and cross-track directions, and reducing erase field. In track density push, reducing the trailing edge physical width of the write pole tip directly helps reduce track pitch. However, with same write field magnitude, reducing write pole width could cause larger track inflation and adjacent track fringing field increase. The large adjacent track fringing field will degrade write field cross-track gradient and worsen track edge erase band. This in turn will limit the further track density push. Confining field in cross-track direction through applying side shield, for example, will improve cross-track field gradient and reduce the erase band. Track density can get big improvement. One reliability issue is during transition writing, magnetization's dynamic activity in side shield will cause side track erasure field that will ruin the recording information in side tracks. The present disclosure provides writer designs, or write head designs, that can significantly increase the write speed (e.g., faster switching) and improve driving current-write field efficiency, thus benefiting HDR performance. The write designs have a shorter magnetic field rise time while decreasing the coil power needed to achieve the magnetic field. The lower coil power will correspond to lower erasure field, benefiting writer's reliability.

An implementation of a recording head disclosed herein includes two yokes, one positioned on each side of the write pole (or main pole). The yoke on the leading side of the write pole has a greater thickness than the yoke on the trailing side of the write pole. Having two yokes, one on each side of the write pole, increases the switching speed of the write head and decreases the power usage, both which improve high data rate performance.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a storage device 100 having an example recording head structure implemented on an end of an actuator assembly. Specifically, FIG. 1 illustrates a top plan view of an implementation of a magnetic media or disc 102 with a transducer head 104 situated on an end of an actuator assembly 106. Disc 102 rotates about a disc axis of rotation 108 during operation in the direction indicated. Further, disc 102 includes an outer diameter 110 and inner diameter 112 between which are a number of data tracks 114, illustrated by dotted lines. Data tracks 114 are substantially circular and are made up of regularly spaced patterned bits.

Information may be written to and read from the patterned bits on data tracks 114 through the use of actuator assembly 106, which rotates during a data track 114 seek operation about an actuator axis of rotation 116. Transducer head 104, mounted on actuator assembly 106 at an end distal from the actuator axis of rotation 116, flies in close proximity above the surface of disc 102 during disc operation. Transducer head 104 includes a recording head including a read pole for reading data from track 114 and a write pole for writing data to track 114.

FIG. 1 also illustrates an expanded view of a partial cross-sectional configuration of transducer head 104, particularly, of a write head portion 120 of transducer head 104. Write head 120 is illustrated with its air bearing surface (ABS) 122 near magnetic media or disc 102. The direction of rotation of disc 102 is indicated in the expanded view.

Specifically, write head 120 includes a write pole 124 (also referred to as the main pole) configured to write data to disc 102 by a magnetic field. Write pole 124 is made of a ferromagnetic material such as, but not limited to, iron (Fe), cobalt (Co), nickel (Ni), and combinations thereof. For example, write pole 124 can comprise an alloy such as, but not limited to, iron and cobalt (FeCo), iron and nickel (FeNi), cobalt, iron and nickel (CoFeNi), iron and aluminum nitride (FeAlN), iron and tantalum nitride (FeTaN), cobalt, iron and boron (CoFeB), cobalt and iron nitride (CoFeN), and the like.

Write head 120 also includes a leading yoke 126 and a trailing yoke 128, which facilitate switching of the magnetic flux from write pole 124. Leading yoke 126 and trailing yoke 128 may also be referred to as "bottom yoke" and "top yoke", respectively. Yokes 126, 128 are made of a high magnetic moment material, such as iron cobalt (FeCo), cobalt iron nickel (CoFeNi), and the like.

Write head 120 is energized using a coil structure 130 around write pole 124 and yokes 126, 128 with a plurality of turns. Coil structure 130 may be a helical coil wrapped around main pole 124 and yokes 126, 128, or coil structure 130 may be composed of planar coils present on each side of main pole 124 and yokes 126, 128. Coil structure 130 is made of an electrically conductive material such as, but not limited to, copper (Cu), silver (Ag), gold (Au), and combinations thereof. Coil structure 130 generates a magnetic field to rotate the magnetization in yokes 126, 128 and write pole 124 from behind ABS 122; the rotation or switching happens when a magnetic domain wall propagates to the ABS 122.

Such a write head design, having leading yoke 126 and trailing yoke 128, improves the efficiency of the coil structure by rebalancing the magnetic flux. For adequate performance of a write head, in general, the magnetic flux is drawn towards the trailing edge of the head, i.e., the direction of flux closure through the trailing shield. By adjusting the ratio of thicknesses between leading yoke 126 and trailing yoke 128, a portion of the flux is rebalanced. In particular, having leading yoke 126 thicker than the trailing yoke 128 by a factor of at least 1.5 moves a portion of flux towards the leading edge, reducing the magnetic flux leakage and corresponding erasure events on the trailing edge without sacrificing the overall performance. Additional implementations of write heads having two yokes with the particular relative thicknesses are described below.

Figure 2:
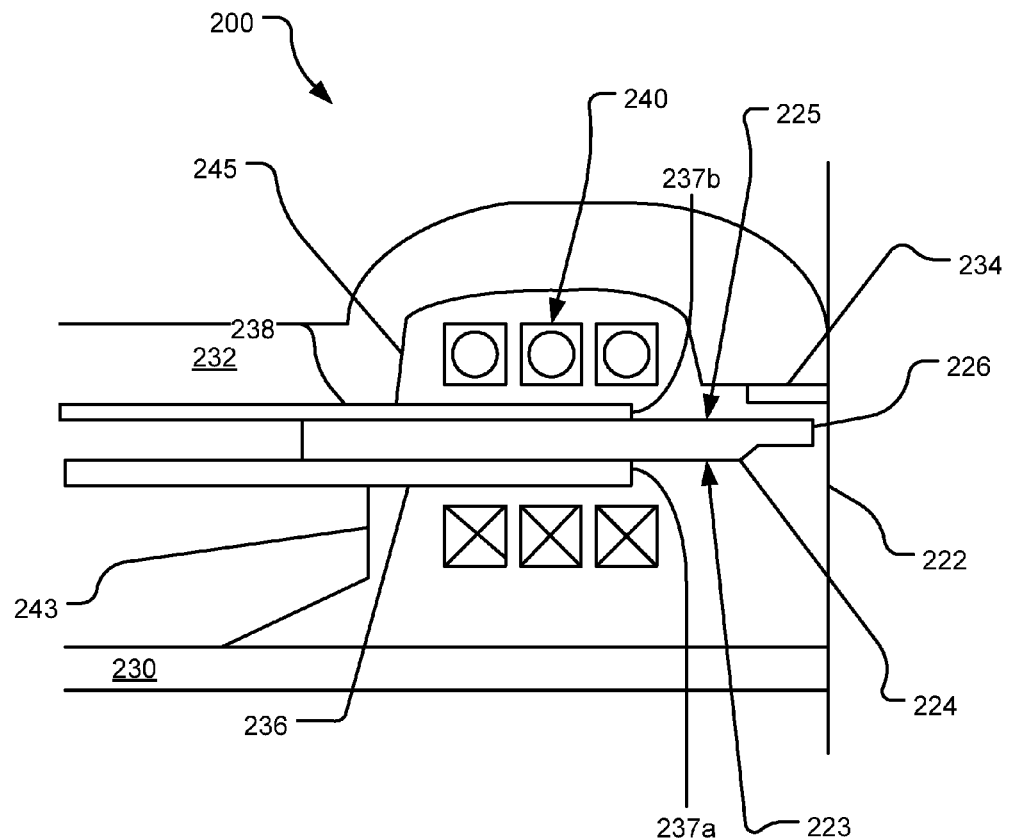
FIG. 2 is a schematic cross-sectional partial side view of an example write head.

FIG. 2 illustrates a write head 200 having an air bearing surface (ABS) 222, a write pole 224 (also referred to as the main pole) defining a leading edge side 223 and a trailing edge side 225; leading edge side 223 engages the disc prior to write pole 224 engaging the disc as it spins, and trailing edge side 225 engages the disc after write pole 224 engages the disc as it spins. Write pole 224 has a pole tip 226 proximate the ABS 222. On leading edge side 223 of write pole 224 is a yoke 236 having a yoke tip 237a recessed from pole tip 226. On trailing edge side 225 of write pole 224 is a yoke 238 having a yoke tip 237b recessed from pole tip 226. Yoke 236 on leading edge side 223 can be referred to as a leading yoke or leading side yoke, and yoke 238 on trailing edge side 225 can be referred to as a trailing yoke or trailing side yoke.

Leading yoke 236 and trailing yoke 238 are parallel to each other. Additionally, in this implementation, each of leading yoke 236 and trailing yoke 238 is orthogonal to the ABS 22 and equally recessed or distanced from the ABS 222.

Each of leading yoke 236 and trailing yoke 238 has a thickness, taken parallel to the ABS 222. The thickness of leading yoke 236 is greater than the thickness of trailing yoke 238 by at least 1.5×; in other words, trailing yoke 238 has a thickness that is two-thirds or less than two-thirds the thickness of leading yoke 236. As indicated above, by having trailing yoke 238 thinner than leading yoke 236, the magnetic flux gravitates towards trailing edge side 225. It was found that having trailing yoke 238 no more than two-thirds of the thickness of leading yoke 236 provided beneficial properties to write head 200; having trailing yoke 238 no more than half of the thickness of leading yoke 236 is even more beneficial.

In some implementations, a ratio of the thickness of leading yoke 236 (or, bottom yoke 236) to the thickness of trailing yoke 238 (or, top yoke 238) is at least 1.5:1 (or, 3:2), in some implementations at least 2:1. One suitable range of ratios is 2:1 to 4:1. Non-limiting example thicknesses of leading yoke 236 and trailing yoke 238 include: 500 nm and 250 nm (for a combined yoke thickness of 750 nm); 600 nm and 150 nm (for a combined yoke thickness of 750 nm); 425 nm and 275 nm (for a combined yoke thickness of 700 nm); 467 nm and 233 nm (for a combined yoke thickness of 700 nm); 500 nm and 200 nm (for a combined yoke thickness of 700 nm); 460 nm and 230 nm (for a combined yoke thickness of 690 nm); 400 nm and 200 nm (for a combined yoke thickness of 600 nm); 450 nm and 150 nm (for a combined yoke thickness of 600 nm); 300 nm and 200 nm (for a combined yoke thickness of 500 nm); and 400 nm and 100 nm (for a combined yoke thickness of 500 nm).

Write head 200 has a first return pole (RP1) 230 on leading edge side 223 of write pole 224 and a second return pole (RP2) 232 on trailing edge side 225 of write pole 224. RP2 232 includes a front shield 234 extending towards write pole 224 at the ABS 222; front shield 234 may be integral with RP2 232 or may be a separate element, either the same or different material than RP2 232. A first back via 243 connects write pole 224 to RP1 230 by way of leading yoke 236 and a second back via 245 connects write pole 224 to RP2 232 by way of trailing yoke 238.

A coil structure 240 is present around write pole 224 and yokes 236, 238 in a plurality of turns. Coil structure 240 extends between leading yoke 236 and RP1 230 and between trailing yoke 238 and RP2 232. For example, coil structure 240 is a helical coil wrapped around write pole 224 and yokes 236, 238, in this implementation, three times around write pole 224 and yokes 236, 238. As a different example, coil structure 240 includes a three-turn planar coil on the leading side of write pole 224 and yoke 236 and a three-turn planar coil on the trailing side of write pole 224 and yoke 238.

Each turn of coil structure 240 is connected in series with the other turns of coil structure 240. However, any suitable configuration of coil structure 240 can be utilized; for example, coil structure 240 can comprise a plurality of coils (e.g., three coils) each forming separate electric circuits. In one implementation, a dielectric or insulating material (not shown), such as alumina ($Al_2O_3$), electrically insulates coil structure 240 from write pole 224 and RP1 230 and from write pole 224 and RP2 232.

Figure 3:
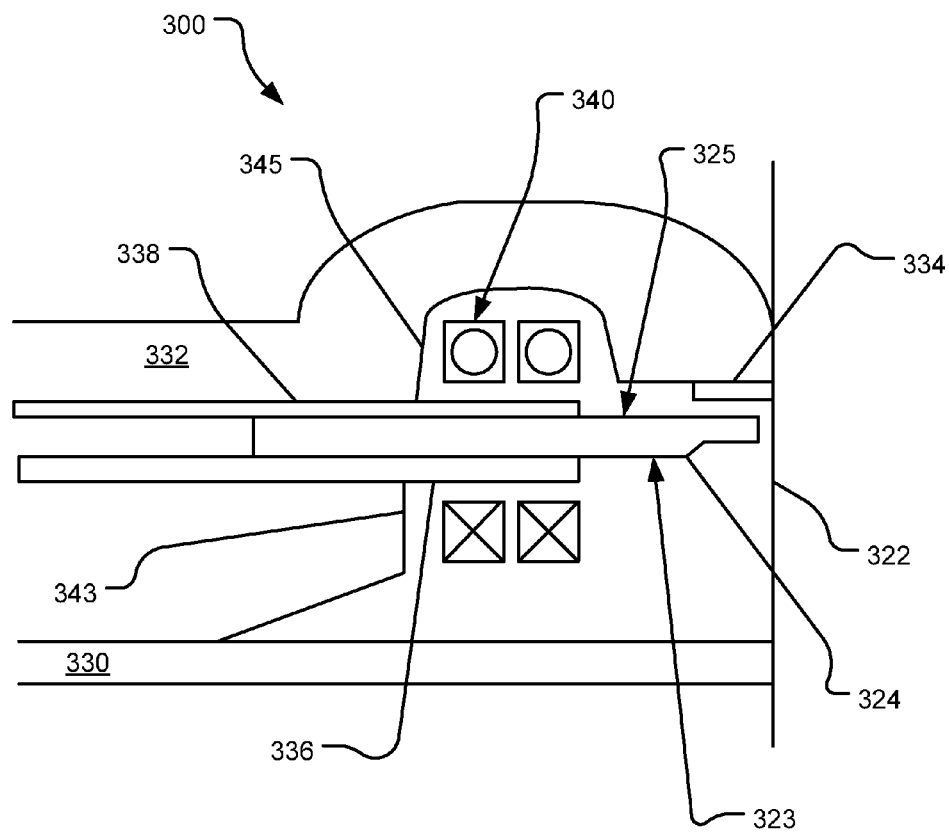
FIG. 3 is a schematic cross-sectional partial side view of another example write head.

FIG. 3 illustrates another implementation of a write head having a leading yoke and a trailing yoke. Unless indicated otherwise, the elements of FIG. 3 are the same as or similar to like elements of FIG. 2.

In FIG. 3, a write head 300 has an air bearing surface (ABS) 322, a write pole 324 (also referred to as the main pole) defining a leading edge side 323 and a trailing edge side 325; leading edge side 323 engages the disc prior to write pole 324 engaging the disc as it spins, and trailing edge side 325 engages the disc after write pole 324 engages the disc as it spins.

On leading edge side 323 of write pole 324 is a leading yoke 336 and on trailing edge side 325 of write pole 324 is a trailing yoke 338. Leading yoke 336 and trailing yoke 338 are parallel to each other and both are orthogonal to the ABS 322. Each of leading yoke 336 and trailing yoke 338 has a thickness, taken parallel to the ABS 322. The thickness of leading yoke 336 is at least 1.5× greater than the thickness of trailing yoke 338; or, in other words, a ratio of leading yoke 336 to trailing yoke 338 is 1.5:1 (or 3:2) or greater.

Write head 300 has a first return pole (RP1) 330 on leading edge side 323 of write pole 324 and a second return pole (RP2) 332 on trailing edge side 325 of write pole 324. RP2 332 includes a front shield 334 extending towards write pole 324 at the ABS 322. A first back via 343 connects write pole 324 to RP1 330 by way of leading yoke 336 and a second back via 345 connects write pole 324 to RP2 332 by way of trailing yoke 338.

A coil structure 340 is present around write pole 324 and yokes 336, 338 with a plurality of turns. Coil structure 340 is present between leading yoke 336 and RP1 330 and between trailing yoke 338 and RP2 332. For example, coil structure 340 is formed as a helical coil wrapped around write pole 324 and yokes 336, 338, in this implementation, two times around write pole 324 and yokes 336, 338. As a different example, coil structure 340 includes a two-turn planar coil on the leading side of write pole 324 and yoke 336 and a two-turn planar coil on the trailing side of write pole 324 and yoke 338. A dielectric or insulating material (not shown), such as alumina ($Al_2O_3$), can electrically insulate coil structure 340 from write pole 324 and RP1 330 and from write pole 324 and RP2 332.

Figure 4:
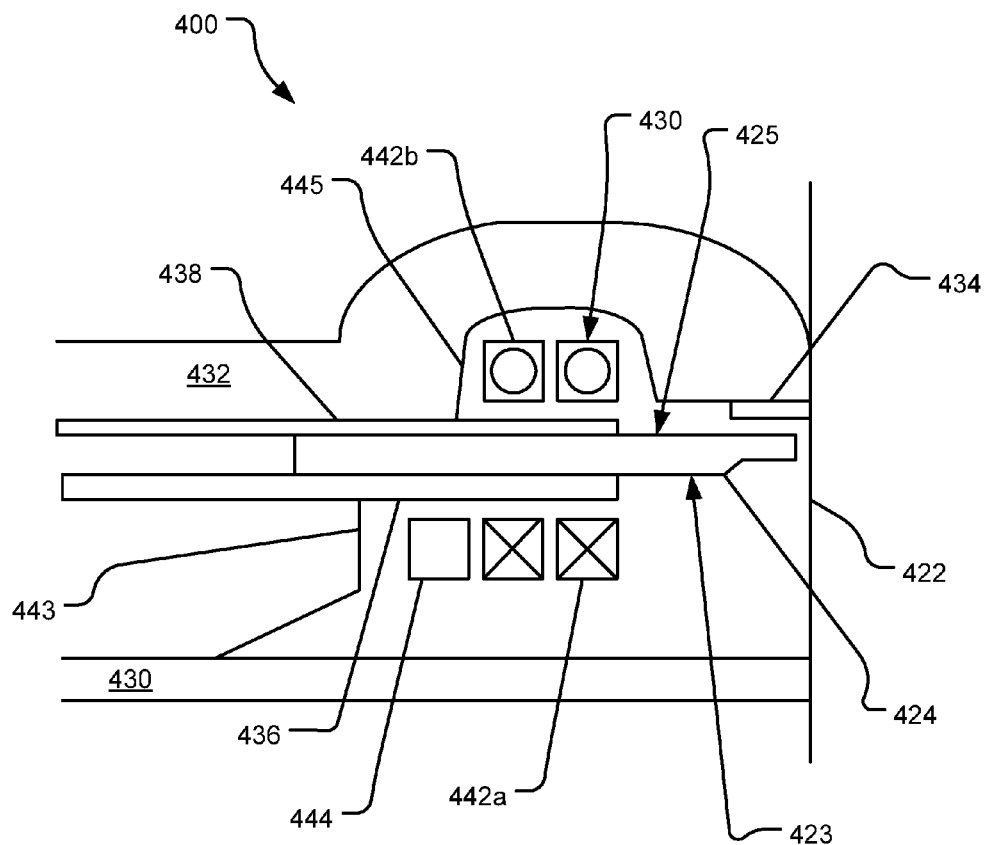
FIG. 4 is a schematic cross-sectional partial side view of yet another example write head.

FIG. 4 illustrates another implementation of a write head having a leading yoke and a trailing yoke. Unless indicated otherwise, the elements of FIG. 4 are the same as or similar to like elements of FIG. 2 and/or of FIG. 3.

In FIG. 4, a write head 400 has an air bearing surface (ABS) 422, a write pole 424 (also referred to as the main pole) defining a leading edge side 423 and a trailing edge side 425; leading edge side 423 engages the disc prior to write pole 424 engaging the disc as it spins, and trailing edge side 425 engages the disc after write pole 424 engages the disc as it spins.

On leading edge side 423 of write pole 424 is a leading yoke 436 and on trailing edge side 425 of write pole 424 is a trailing yoke 438. Leading yoke 436 and trailing yoke 438 are parallel to each other and both are orthogonal to the ABS 422. Each of leading yoke 436 and trailing yoke 438 has a thickness, taken parallel to the ABS 422. The thickness of leading yoke 436 is at least 1.5× greater than the thickness of trailing yoke 438; or, a ratio of the thickness of leading yoke 436 to trailing yoke 438 is 1.5:1 (or 3:2) or greater.

Write head 400 has a first return pole (RP1) 430 on leading edge side 423 of write pole 424 and a second return pole (RP2) 432 on trailing edge side 425 of write pole 424. RP2 432 includes a front shield 434 extending towards write pole 424 at the ABS 422. A first back via 443 connects write pole 424 to RP1 430 by way of leading yoke 436 and a second back via 445 connects write pole 424 to RP2 432 by way of trailing yoke 438.

A coil structure 440 is present around write pole 424 and yokes 436, 438 with a plurality of active turns 442. Coil structure 440 wraps between leading yoke 436 and RP1 430 and between trailing yoke 438 and RP2 432. A dielectric or insulating material (not shown), such as alumina ($Al_2O_3$), can electrically insulate coil structure 440 from write pole 424 and RP1 430 and from write pole 424 and RP2 432.

Turns 442 of coil structure 440 on leading edge side 423 next to leading yoke 436 are identified as turns 442a and turns on trailing edge side 425 next to trailing yoke 438 are identified as turns 442b. Coil structure 440 can be a helical coil wrapped around write pole 424 and yokes 436, 438, in this implementation, with two active turns 442 that conduct current and one dummy turn 444 that does not conduct current. Alternately, coil structure 440 can be a three-turn planar coil on the leading side of write pole 424 and yoke 436, with two active turns 442 and one dummy turn 444, and a two-turn planar coil (with two active turns 442) on the trailing side of write pole 424 and yoke 438. Dummy turn 444 may be physically connected to active turn 442a or may be physically separated from any and all active turns 442.

Dummy turn 444 is present to reduce potential flux leakage from coil structure 440 to leading back via 443 and other bulky magnetic materials far away from the ABS 422, by increasing the distance between any active turn 442 (particularly, active turn 442a) and back via 443. Although the region between active turn 442a and back via 443 could be filled with the dielectric or insulating material (e.g., alumina) surrounding coil structure 440, dummy turn 444 is provided to fill the area with, for example, a less expensive material. In some implementations, dummy turn 444 is provided to facilitate forming (e.g., by plating, deposition, etc.) of write head 400 and its various elements.

All of the write heads described above, write heads 200, 300, 400, and variations thereof, can be fabricated by various methods, including plating, deposition, etching, milling, and other processing techniques.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top," "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A write head comprising:
    a main pole having a pole tip proximate an air bearing surface (ABS), the main pole having a leading side and a trailing side;
    a leading yoke on the leading side of the main pole;
    a trailing yoke on the trailing side of the main pole; and
    a coil structure around the main pole and yokes, the coil structure comprising no more than two active turns and a dummy turn, the dummy turn located more distal from the pole tip than the no more than two active turns;
    wherein a ratio of a thickness of the leading yoke to a thickness of the trailing yoke is at least 1.5:1.

2. The write head of claim 1 wherein a ratio of the leading yoke thickness to the trailing yoke thickness is at least 2:1.

3. The write head of claim 1 wherein a ratio of the leading yoke thickness to the trailing yoke thickness is 2:1 to 4:1.

4. The write head of claim 1, wherein the leading yoke and the trailing yoke have a combined thickness of 700 nm.

5. The write head of claim 1, wherein the leading yoke and the trailing yoke are parallel.

6. The write head of claim 1, wherein the leading yoke and the trailing yoke are orthogonal to the ABS.

7. The write head of claim 1, wherein the dummy turn is on the leading side of the main pole.

8. The write head of claim 1, wherein the coil structure is a helical coil.

9. The write head of claim 1, wherein the coil structure comprises planar turns.

10. A disc drive comprising:
    at least one magnetic storage disc; and
    a transducer head comprising a read head and a write head, the write head comprising a leading yoke and a trailing yoke having a ratio of a thickness of the leading yoke to a thickness of the trailing yoke of at least 1.5:1, a pole having a pole tip positioned between the leading yoke and the trailing yoke, and a coil structure around the yokes, the coil structure comprising no more than two active turns and a dummy turn, the dummy turn located more distal from the pole tip than the no more than two active turns.

11. The disc drive of claim 10, wherein the leading yoke and the trailing yoke have a combined thickness of 700 nm.

12. The disc drive of claim 10, wherein the coil structure has two active turns.

13. A write head comprising:
    a main pole having a pole tip, a leading side and a trailing side;
    a leading yoke on the leading side of the main pole having a leading yoke tip;
    a trailing yoke on the trailing side of the main pole, with the leading yoke having a thickness that is at least 1.5× of a trailing yoke thickness; and
    a coil structure comprising a dummy turn and no more than two active turns on the leading side of the leading yoke, the dummy turn located more distal from the pole tip than the no more than two active turns.

14. The write head of claim 13, wherein the leading yoke thickness is at least 2× of the trailing yoke thickness.

15. The write head of claim 13, wherein the leading yoke and the trailing yoke have a combined thickness of 700 nm.

16. The write head of claim 13, wherein the coil structure comprises the dummy turn and two active turns.

17. The write head of claim 13, with an active turn of the coil structure aligned with the leading yoke tip.

* * * * *